United States Patent
Jang et al.

(10) Patent No.: US 9,853,406 B2
(45) Date of Patent: Dec. 26, 2017

(54) GROUND STRUCTURE FOR MOTOR

(71) Applicant: NEW MOTECH CO., LTD., Gwangju (KR)

(72) Inventors: Jeong Cheol Jang, Gwangju (KR); Wang gyu Jeong, Gwangju (KR); Byung soo Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 274 days.

(21) Appl. No.: 14/772,382

(22) PCT Filed: May 8, 2014

(86) PCT No.: PCT/KR2014/004094
§ 371 (c)(1),
(2) Date: Sep. 3, 2015

(87) PCT Pub. No.: WO2014/189219
PCT Pub. Date: Nov. 27, 2014

(65) Prior Publication Data
US 2015/0380887 A1 Dec. 31, 2015

(30) Foreign Application Priority Data

May 23, 2013 (KR) .................. 10-2013-0058368

(51) Int. Cl.
*H02K 11/00* (2016.01)
*H01R 39/12* (2006.01)
*H02K 11/40* (2016.01)

(52) U.S. Cl.
CPC ............. *H01R 39/12* (2013.01); *H02K 11/40* (2016.01)

(58) Field of Classification Search
CPC ...................................................... H02K 11/40
(Continued)

(56) References Cited

U.S. PATENT DOCUMENTS 5,327,036 A * 7/1994 Carey .................. H02K 5/20
310/51
5,343,102 A * 8/1994 Mabuchi .............. H02K 5/145
310/40 MM (Continued)

FOREIGN PATENT DOCUMENTS

JP 2003-235214 A 8/2003
JP 2007159302 A 6/2007

(Continued)

OTHER PUBLICATIONS

International Search Report for PCT/KR2014/004094 dated Jul. 11, 2014 from Korean Intellectual Property Office.

*Primary Examiner* — Jeremy Luks
(74) *Attorney, Agent, or Firm* — Revolution IP, PLLC

(57) ABSTRACT

A ground structure for a motor including: a housing having a flange protruded upwardly from the outer periphery of an opening formed on the top surface thereof; a bearing cover having a coupling groove formed along the outer periphery of the underside thereof to inserted the flange of the housing thereinto; a stator core fixedly disposed to the inside of the housing and having a plurality of teeth on which a coil is wound formed annularly along the inner periphery thereof; and a connector having one end coupled to the flange of the housing in such a manner as to be brought into contact with the coupling groove of the bearing cover when the bearing cover is coupled to the top end periphery of the housing and the other end passed through the housing in such a manner as to be brought into contact with the stator core.

4 Claims, 3 Drawing Sheets

(58) Field of Classification Search
USPC .................................................. 310/71, 90
See application file for complete search history.

(56) References Cited

U.S. PATENT DOCUMENTS

| | | | | |
|---|---|---|---|---|
| 5,596,237 | A | * | 1/1997 | Daniels .................. H02K 11/40 310/71 |
| 8,546,989 | B2 | * | 10/2013 | Watanabe ............ H02K 5/1732 310/156.01 |
| 2003/0151318 | A1 | | 8/2003 | Noda et al. |
| 2005/0275297 | A1 | * | 12/2005 | Suzuki .................. H02K 5/225 310/71 |
| 2006/0175917 | A1 | | 8/2006 | Nanbu et al. |
| 2011/0234024 | A1 | * | 9/2011 | Hasegawa ................ H02K 5/08 310/43 |
| 2012/0248911 | A1 | * | 10/2012 | Ono ........................ H02K 5/02 310/90 |
| 2014/0232216 | A1 | * | 8/2014 | Yamada .................. H02K 5/08 310/43 |
| 2015/0123501 | A1 | * | 5/2015 | Jang ........................ H02K 5/08 310/43 |

FOREIGN PATENT DOCUMENTS

| | | |
|---|---|---|
| KR | 10-2006-0006608 A | 1/2006 |
| KR | 10-1222675 B1 | 1/2013 |
| WO | 2004-088818 A1 | 10/2004 |

* cited by examiner

[Fig. 1]
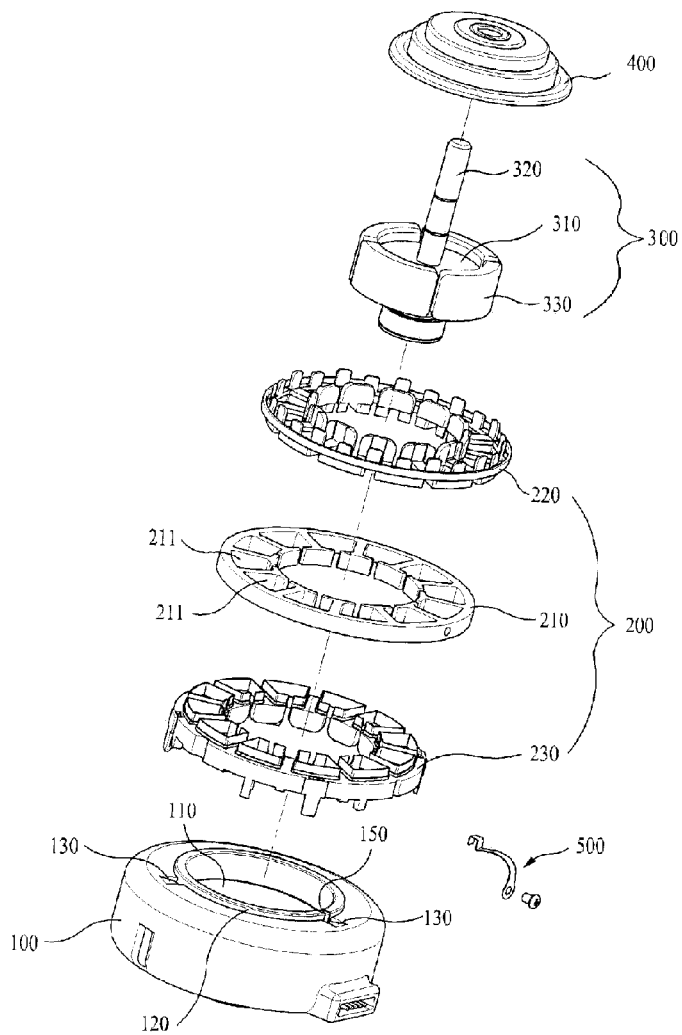
[Fig. 2]
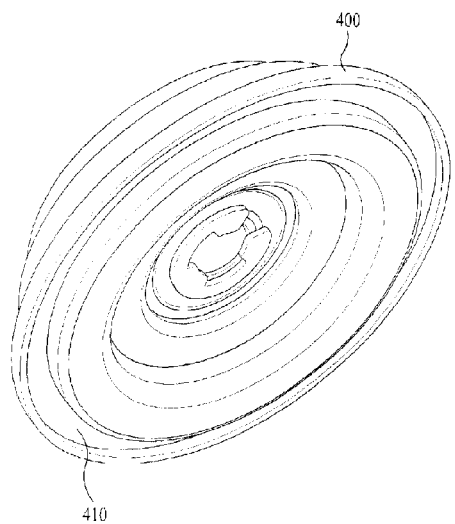

[Fig. 3]
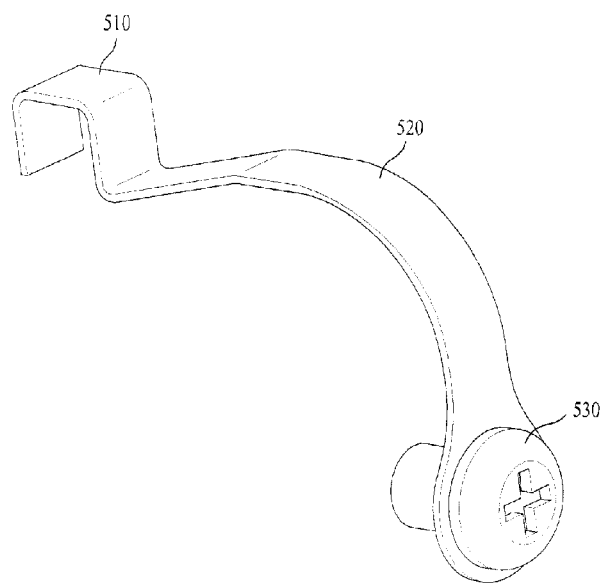
[Fig. 4]
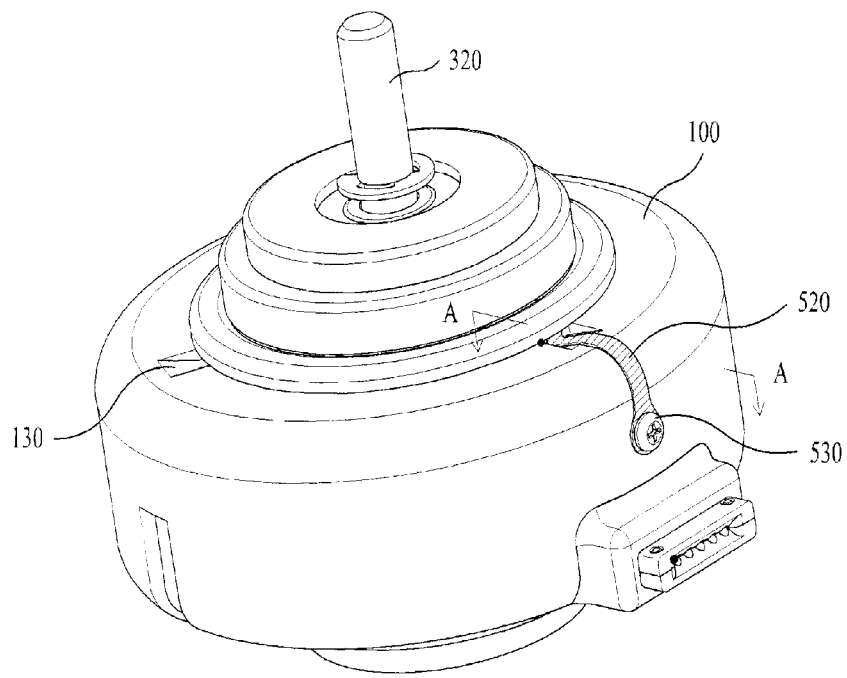

[Fig. 5]
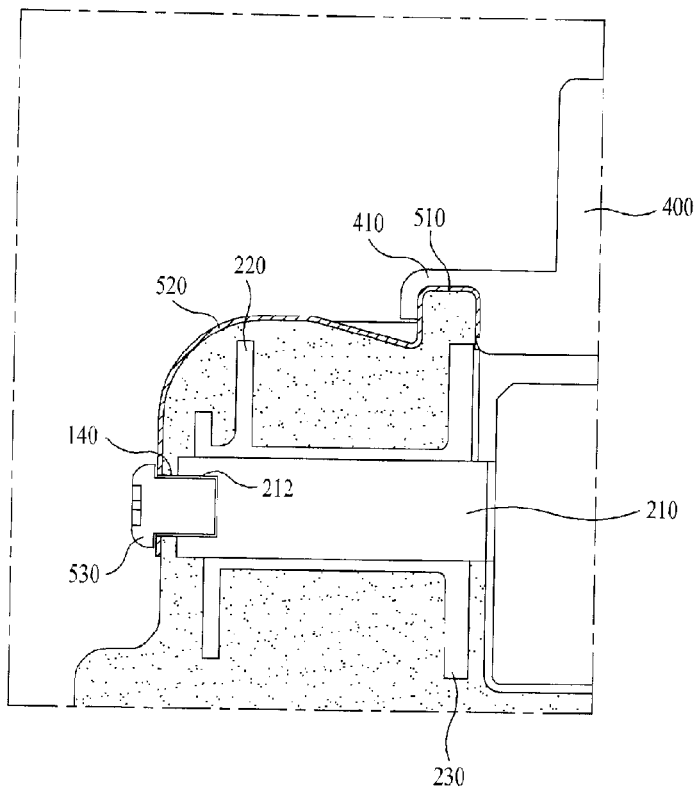
[Fig. 6]
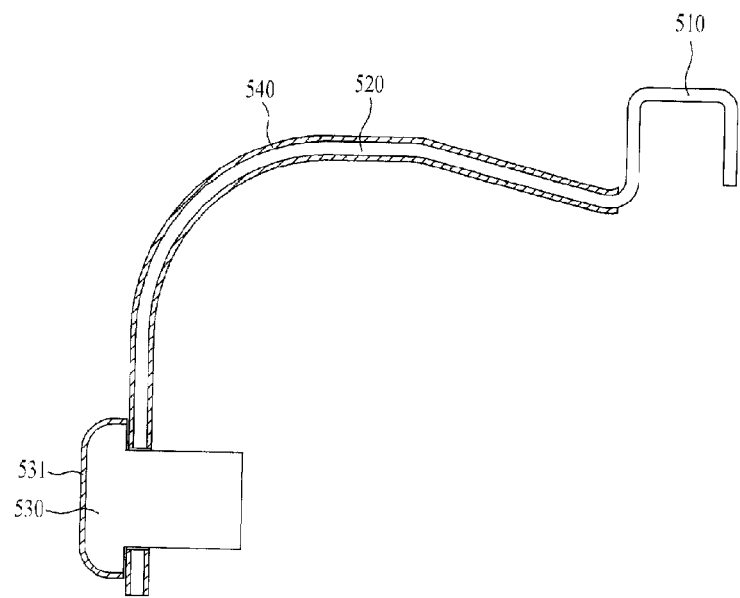

GROUND STRUCTURE FOR MOTOR

CROSS REFERENCE TO PRIOR APPLICATIONS

This application is a National Stage Application of PCT International Patent Application No. PCT/KR2014/004094 filed on May 8, 2014, under 35 U.S.C. §371, which claims priority to Korean Patent Application No. 10-2013-0058368 filed on May 23, 2013, which are all hereby incorporated by reference in their entirety.

TECHNICAL FIELD

The present invention relates to a ground structure for a motor, and more particularly, to a ground structure for a motor that is simply installed and disassembled to reduce work efforts and that prevents the leakage of an electric current applied to the motor to avoid the generation of high frequency noise and the electrical corrosion of a bearing.

BACKGROUND ART

Generally, a motor has a stator coupled to the inner peripheral surface of a cylindrical housing and a rotor with a rotary shaft rotatably coupled to the center of the stator, so that as the rotor is rotated with the power supplied from the outside, the motor operates the rotary shaft protruded outwardly from the rotor.

Further, the motor has a disc-shaped bearing cover coupled to the top end periphery of the housing by means of coupling means like bolts, so that the bearing cover is coupled to the housing to constitute the outer shape of the motor and to support the rotation of the rotor.

At this time, the bearing cover has a bearing disposed at the inner side of the center thereof so as to reduce the friction with the contacted surface with the rotary shaft and to continuously maintain accurate coupling position with the stator, and accordingly, the formation of the bearing enables the rotor to be stably rotated.

Such motor is widely used as a drive system of electric appliances including air conditioners, and if grounding fails, a user may get shocked by leakage current. Further, high frequency noise may be generated by leakage current, thus causing peripheral devices to be malfunctioned.

If the leakage current flows through the bearing, particularly, a spark, that is, an arc is generated from the narrow space of the bearing to cause the bearing to be electrically corroded, so that grooves may be undesirably formed on the surface of the bearing, thus making the bearing easily destructed.

For the grounding of the motor, accordingly, a separate ground frame is formed on the bearing cover, and otherwise, a hole is formed on the bearing cover so as to fix a ground terminal thereto. However, these methods make the bearing cover undesirably complicated in structure, thus increasing the total size of the motor, making it hard to perform the installating and disassembling works, and increasing the work efforts necessary for the assembly of the motor.

DISCLOSURE OF INVENTION

Technical Problem

Accordingly, the present invention has been made in view of the above-mentioned problems occurring in the prior art, and it is an object of the present invention to provide a ground structure for a motor that is simply installed and disassembled to reduce work efforts and that prevents the leakage of an electric current applied to the motor to avoid the generation of high frequency noise and the electrical corrosion of a bearing.

Solution to Problem

To accomplish the above object, according to the present invention, there is provided a ground structure for a motor including: a housing made of a resin material and having a flange protruded upwardly from the outer periphery of an opening formed on the top surface thereof; a bearing cover made of a metal material and having a coupling groove formed along the outer periphery of the underside thereof so as to coupledly inserted the flange of the housing thereinto; a stator core fixedly disposed to the inside of the housing and having a plurality of teeth on which a coil is wound formed annularly along the inner periphery thereof; and a connector made of a metal material and having one end coupled to the flange of the housing in such a manner as to be brought into contact with the coupling groove of the bearing cover when the bearing cover is coupled to the top end periphery of the housing and the other end passed through the housing in such a manner as to be brought into contact with the stator core.

According to the present invention, preferably, the connector includes a clip type bracket adapted to surround the outer peripheral surface of the flange of the housing, a connection plate extended from one side of the bracket in such a manner as to be brought into contact with the outer peripheral surface of the housing, and a screw adapted to be passed through the housing in such a manner as to be screw-coupled to the stator core and at the same time adapted to pressurize the connection plate to fix the connection plate to the outer peripheral surface of the housing, and the housing and the stator core have fastening holes formed for screw-coupling with the screw thereon.

According to the present invention, preferably, the connection plate is covered with a cover made of a resin material on the outer surface thereof, and the screw has an insulating layer formed on the head portion thereof.

According to the present invention, preferably, the flange has a mounting groove formed at a given position of the outer peripheral surface thereof in such a manner as to be coupled to the bracket of the connector.

According to the present invention, preferably, the housing has a plurality of depressed grooves formed on the top end periphery thereof, into which a user's finger or a tool is inserted to push the underside of the bearing cover upwardly, so that the bearing cover is separated from the housing.

Advantageous Effects of Invention

According to the present invention, the ground structure for the motor is simple, so that the manufacturing cost can be lowered, and further, after the bracket of the connector is coupled to the mounting groove of the flange of the housing and the connection plate of the connector is fixed to the outer peripheral surface of the housing, the bearing cover is coupled to the top end periphery of the housing, so that the stator core and the bearing cover are electrically connected with each other by means of the connector, thus performing grounding in easy and rapid manners.

BRIEF DESCRIPTION OF DRAWINGS

FIG. 1 is an exploded perspective view showing a ground structure for a motor according to the present invention.

FIG. 2 is a perspective view showing the underside of a bearing cover of the ground structure for the motor according to the present invention.

FIG. 3 is a perspective view showing a connector of the ground structure for the motor according to the present invention.

FIG. 4 is a perspective view showing a state wherein the connector is coupled to a housing of the ground structure for the motor according to the present invention.

FIG. 5 is a sectional view taken along the line A-A of FIG. 3.

FIG. 6 is a sectional view showing another connector of the ground structure for the motor according to the present invention.

MODE FOR THE INVENTION

Hereinafter, an explanation on a ground structure for a motor according to the present invention will be in detail given with reference to the attached drawings. In the description of the invention, the identical names and reference numerals to the same parts as each other will be applied, and their repeated explanation will be avoided for the brevity of the description.

FIG. 1 is an exploded perspective view showing a ground structure for a motor according to the present invention.

As shown in FIG. 1, a ground structure for a motor according to the present invention largely includes a housing 100, a stator assembly 200, a rotor assembly 300, a bearing cover 400 and a connector 500.

The housing 100 has an opening 110 formed on the top surface thereof in such a manner as to be open and closed by the bearing cover 400 and a flange 120 protruded upwardly from the outer periphery of the opening 110 in such a manner as to be coupled to the bearing cover 400.

The housing 100 is made of a resin material which is insulated from the stator assembly 200 mounted at the inside thereof, and in this case, the housing 100 is made separately from the stator assembly 200 and assembled thereto. Otherwise, the housing 100 may be formed unitarily with the stator assembly 200 by means of BMC (Bulk Molding Compound).

The stator assembly 200 includes a stator core 210 and insulators 220 and 230.

The stator core 210 is formed by stacking silicon steel plates on top of each other and has a plurality of teeth 211 on which a coil (not shown) is wound formed along the inner periphery thereof.

The insulators 220 and 230 are the upper insulator 220 and the lower insulator 230 coupled to the upper and lower portions of the stator core 210 and adapted to surround the inner peripheral surface of the stator core 210 and the portion of the teeth 211 wherein the coil is wound to prevent the coil to which electric current is applied from being brought into direct contact with the inner peripheral surface of the stator core 210 and the teeth 211.

The upper and lower insulators 220 and 230 are made of a synthetic resin material such as polyacetal, polyoxymethylene and the like, and in this case, they are made separately from the stator core 210 and assembled thereto. Otherwise, they may be formed unitarily with the stator core 210 by means of insert molding.

The rotor assembly 300 includes a rotor core 310 disposed at the inside of the stator assembly 200, a rotary shaft 320 fixed to the rotor core 310, and magnets 330 mounted along the outer peripheral surface of the rotor core 310.

The rotor core 310 is located to face the teeth 211 on which the coil is wound, and if power is applied to the coil, the rotor core 310 starts to rotate. As a result, the rotary shaft 320 whose top end portion is connected to washing wings of a washing machine or a compressor of an air conditioner starts to rotate, thus driving the washing machine or the compressor. The structure of the rotor assembly 300 is well known, and therefore, its detailed explanation will be avoided for the brevity of the description.

The bearing cover 400 is made of a metal material and detachably mounted to the top end periphery of the housing 100. The bearing cover 400 has a bearing (not shown) mounted at the inside thereof so as to rotatably support the rotary shaft 320 thereagainst.

FIG. 2 is a perspective view showing the underside of a bearing cover of the ground structure for the motor according to the present invention.

As shown in FIG. 2, the bearing cover 400 has a coupling groove 410 formed on the outer periphery of the underside thereof so as to insert the flange 120 formed along the outer periphery of the opening 110 of the housing 100 thereinto.

When the bearing cover 400 is coupled to the housing 100, accordingly, the coupling groove 410 of the bearing cover 400 is located over the flange 120 of the housing 100, and after that, the bearing cover 400 is pressed so that the flange 120 of the housing 100 is inserted into the coupling groove 410. To the contrary, if the bearing cover 400 is separated from the housing 100, the bearing cover 400 is pushed upward so that the flange 120 of the housing 100 is escaped from the coupling groove 410 of the bearing cover 400.

So as to separate the bearing cover 400 from the housing 100 in an easier manner, in this case, a plurality of depressed grooves 130 is formed on the top end periphery of the housing 100, into which a user s finger or a tool is inserted.

In this case, the user's finger or tool is inserted into the depressed grooves 130 and easily pushes the underside of the bearing cover 400 upwardly, so that the bearing cover 400 can be easily separated from the housing 100.

The connector 500 is made of a metal material and has one end coupled to the flange 120 of the housing 100 in such a manner as to be brought into contact with the bearing cover 400 when the bearing cover 400 is coupled to the top surface of the housing 100 and the other end passed through the housing 100 in such a manner as to be brought into contact with the stator core 210.

FIG. 3 is a perspective view showing a connector of the ground structure for the motor according to the present invention.

As shown in FIG. 3, the connector 500 includes a clip type bracket 510 adapted to surround the outer peripheral surface of the flange 120 of the housing 100, a connection plate 520 extended from one side of the bracket 510 in such a manner as to be brought into contact with the outer peripheral surface of the housing 100, and a screw 530 adapted to be passed through the housing 100 in such a manner as to be screw-coupled to the stator core 210 and at the same time adapted to pressurize the connection plate 520 to fix the connection plate 520 to the outer peripheral surface of the housing 100.

FIG. 4 is a perspective view showing a state wherein the connector is coupled to a housing of the ground structure for the motor according to the present invention, and FIG. 5 is a sectional view taken along the line A-A of FIG. 3.

As shown in FIGS. 4 and 5, the bracket 510 is coupled to the flange 210 of the housing 100, and the screw 530 is passed through the housing 100 and screw-coupled to the stator core 210, so that the connector 500 and the stator core 210 are electrically connected to each other. In this state, further, if the bearing cover 400 is coupled to the top surface of the housing 100, the bracket 510 surrounding the flange 120 is inserted into the coupling groove 410 of the bearing cover 400, together with the flange 120 and comes into contact with the coupling groove 410, so that the stator core 210 and the bearing cover 400 are electrically connected with each other by means of the connector 500, thus conducting grounding.

In this case, the housing 100 and the stator core 210 have fastening holes 140 and 212 formed for screw-coupling with the screw 530 thereon, so that the screw 530 is passed through the housing 100 and coupled to the fastening hole 212 of the stator core 210.

On the other hand, as shown in FIG. 1, the flange 120 has a mounting groove 150 formed at a given position of the outer peripheral surface thereof in such a manner as to be coupled to the bracket 510 of the connector 500. As mentioned above, if the bearing cover 400 is coupled to the housing 100, the flange 120 is inserted into the coupling groove 410 formed on the bearing cover 400, and at this time, as the thickness of the flange 120 coupled to the bracket 510 becomes increased by the thickness of the bracket 510, the flange 120 may be not inserted into the coupling groove 410, so that the bearing cover 400 is not coupled to the housing 100.

Accordingly, the flange 120 to which the bracket 510 is coupled has the mounting groove 150 having a given depth, so that the thickness of the flange 120 to which the bracket 510 is coupled becomes smaller than the inside width of the coupling groove 410, thus inserting the bracket 510 and the flange 120 into the coupling groove 410.

If the mounting groove 150 is formed on the given position of the flange 120, the portion of the flange 120 to which the bracket 510 is coupled can be easily recognized by the worker, thus rapidly conducting the assembling work of the connector 500.

FIG. 6 is a sectional view showing another connector of the ground structure for the motor according to the present invention.

On the other hand, as shown in FIG. 6, the connection plate 520 is covered with a cover 540 made of a resin material on the outer surface thereof, and the screw 530 desirably has an insulating layer 531 formed on the head portion thereof.

If the connector 500 is mounted on the housing 100, the connection plate 520 and the head portion of the screw 530 are exposed to the outside, and accordingly, if a human being is brought into contact with the connector 500 electrically connecting the stator core 210 and the bearing cover 400 to each other, the human being may get shocked. Accordingly, the outer surface of the connection plate 520 is covered with the cover 540 made of the resin material, and further, the insulating layer 531 is formed on the head portion of the screw 530, thus previously preventing the occurrence of the danger of safety accidents due to the electric shock.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A ground structure for a motor, comprising:
a housing made of a resin material and having a flange protruded upwardly from the outer periphery of an opening formed on the top surface thereof;
a bearing cover made of a metal material and having a coupling groove formed along the outer periphery of the underside thereof so as to coupledly inserted the flange of the housing thereinto;
a stator core fixedly disposed to the inside of the housing and having a plurality of teeth on which a coil is wound formed annularly along the inner periphery thereof; and
a connector made of a metal material and having one end coupled to the flange of the housing in such a manner as to be brought into contact with the coupling groove of the bearing cover when the bearing cover is coupled to the top end periphery of the housing and the other end passed through the housing in such a manner as to be brought into contact with the stator core, wherein the connector comprises a clip type bracket adapted to surround the outer peripheral surface of the flange of the housing, a connection plate extended from one side of the bracket in such a manner as to be brought into contact with the outer peripheral surface of the housing, and a screw adapted to be passed through the housing in such a manner as to be screw-coupled to the stator core and at the same time adapted to pressurize the connection plate to fix the connection plate to the outer peripheral surface of the housing, and the housing and the stator core have fastening holes formed for screw-coupling with the screw thereon.

2. The ground structure for a motor according to claim 1, wherein the connection plate is covered with a cover made of a resin material on the outer surface thereof, and the screw has an insulating layer formed on the head portion thereof.

3. The ground structure for a motor according to claim 1, wherein the flange has a mounting groove formed at a given position of the outer peripheral surface thereof in such a manner as to be coupled to the bracket of the connector.

4. The ground structure for a motor according to claim 1, wherein the housing has a plurality of depressed grooves formed on the top end periphery thereof, into which a user's finger or a tool is inserted to push the underside of the bearing cover upwardly, so that the bearing cover is separated from the housing.

* * * * *